United States Patent
Yamaguchi et al.

(10) Patent No.: US 6,826,496 B2
(45) Date of Patent: Nov. 30, 2004

(54) CIRCUITRY FOR AND A METHOD OF DETECTING TONAL SIGNALS WITH THE PROCESSING CAPACITY DISTRIBUTED WITH WEIGHT TO FREQUENCY AND TIME DOMAINS

(75) Inventors: Nobuyuki Yamaguchi, Saitama (JP); Hiromi Aoyagi, Kanagawa (JP); Atsushi Yokoyama, Saitama (JP); Kazuyoshi Akie, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 179 days.

(21) Appl. No.: 09/994,814

(22) Filed: Nov. 28, 2001

(65) Prior Publication Data

US 2002/0147556 A1 Oct. 10, 2002

(30) Foreign Application Priority Data

Feb. 23, 2001 (JP) ........................................ 2001-048903

(51) Int. Cl.[7] ............................................. G01R 23/00
(52) U.S. Cl. ........................ 702/75; 702/73; 324/76.57
(58) Field of Search ............................ 702/73–79, 189, 702/191, 193, 194, 195, 197; 324/76.19, 76.21, 76.39, 76.51, 76.57, 76.59; 379/90.01, 93.09, 100.01; 455/182.1–182.3, 192.1–192.3

(56) References Cited

U.S. PATENT DOCUMENTS 3,937,899 A * 2/1976 Denenberg ................... 702/74
4,119,808 A * 10/1978 Atkin ........................ 324/76.57
4,127,846 A * 11/1978 Mori et al. ............. 340/825.75
4,398,147 A * 8/1983 Shankland ................ 324/76.39
4,797,931 A * 1/1989 Furukawa et al. ............. 381/56
6,026,419 A * 2/2000 Hasegawa .................... 708/312
6,052,573 A    4/2000 Ohmori et al.

FOREIGN PATENT DOCUMENTS

| JP | 4354450  | 12/1992 |
| JP | 10013458 | 1/1998  |
| JP | 10224834 | 8/1998  |

* cited by examiner

Primary Examiner—Marc S. Hoff
Assistant Examiner—Manuel L. Barbee
(74) Attorney, Agent, or Firm—Rabin & Berdo, P.C.

(57) ABSTRACT

Circuitry for detecting tonal signals, each of which has a particular nature in the frequency or time domain, while distinguishing them from each other. A rough frequency analyzer roughly analyzes an input signal in an entire frequency band with lower accuracy in the frequency or time domain, thereby roughly distinguishing the tonal signals. Detectors, each of which is associated with a subband occupied by a particular target tonal signal, detect the attribute of the power variation of the target tonal signal with respect to time with higher accuracy in the direction of the frequency or time domain to thereby finely identify the target tonal signal. A controller selectively enables and disables the detectors in accordance with the results from the detectors. One of the detectors is enabled which is selected under the control of the controller.

8 Claims, 5 Drawing Sheets

| SUBBANDS INCLUDING TONE | DETECTOR ENABLED |
|---|---|
| SUBBAND WB1 | DETECTOR FOR SIGNALING TONE |
| SUBBANDS WB2 & WB3 | DETECTOR FOR DTMF SIGNAL |
| SUBBAND WB3 | DETECTOR FOR FAX TONE SIGNAL |

CIRCUITRY FOR AND A METHOD OF DETECTING TONAL SIGNALS WITH THE PROCESSING CAPACITY DISTRIBUTED WITH WEIGHT TO FREQUENCY AND TIME DOMAINS

BACKGROUND OF THE INVENTION

1. Field of the Invention

The present invention relates to a method of detecting tonal signals while distinguishing them from each other and circuitry for practicing the same.

2. Description of the Background Art

It is a common practice with tonal signal detector circuitry to use Fourier transform or a filter bank for analyzing the spectrum of an input signal. Alternatively, to detect a desired tonal signal, use may be made of linear predictive analysis for monitoring the peak of the frequency spectrum of an input signal and a predictive gain at the peak.

A problem with the conventional signal detection schemes described above is that when a plurality of tonal signals to be detected exist, analysis should be executed with even accuracy over the entire frequency band that includes all of the expected tonal signals. Such analysis needs a prohibitive amount of calculations and is therefore not efficient. Presumably, the fact that information representative of the results of past detection is not effectively used is another cause that obstructs efficient detection. It follows that the accuracy of tonal signal detection cannot be enhanced without further increasing the amount of calculations and therefore the processor capacity of a computer or processing circuitry. Generally, enhancing the processor capacity scales up the computing circuitry and increases the cost.

SUMMARY OF THE INVENTION

It is an object of the present invention to provide a tonal signal detecting method capable of accurately detecting tonal signals with a minimum amount of calculations while distinguishing them from each other, and circuitry for practicing the same.

In accordance with the present invention, circuitry for detecting a plurality of tonal signals each having a particular nature in a frequency or a time domain while distinguishing them from each other includes a rough frequency analyzing circuit for roughly analyzing an input signal in a frequency band with lower accuracy in the frequency or time domain to thereby generally distinguish the tonal signals. The frequency band consists of a plurality of subbands. A plurality of fine frequency analyzing circuits each assigned to particular one of the subbands which is associated with a particular target tonal signal detect, in the particular narrower band, the attribute of the power variation of the target tonal signal with respect to time with higher accuracy in the direction of frequency or time domain to thereby finely identify the target tonal signal. A control circuit selectively enables and disables the fine frequency analyzing circuits in accordance with the result from the rough frequency analyzing circuit. One of the detectors is enabled which is selected under the control of the controller.

Also, in accordance with the present invention, a method of detecting a plurality of tonal signals each having a particular nature in a frequency or a time domain while distinguishing them from each other begins with the step of roughly analyzing an input signal in a frequency band with lower accuracy in the frequency or time domain to thereby generally distinguish the tonal signals. The frequency band consists of a plurality of subbands. In each of the plurality of subbands, an attribute of a power variation of a particular target tonal signal of the plurality of tonal signals which is associated with each subband with respect to time is detected with higher accuracy in the direction of frequency or time domain to thereby finely identify the target tonal signal. The plurality of subbands to be subjected to detecting the attribute are selected in accordance with a result from detecting the attribute.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
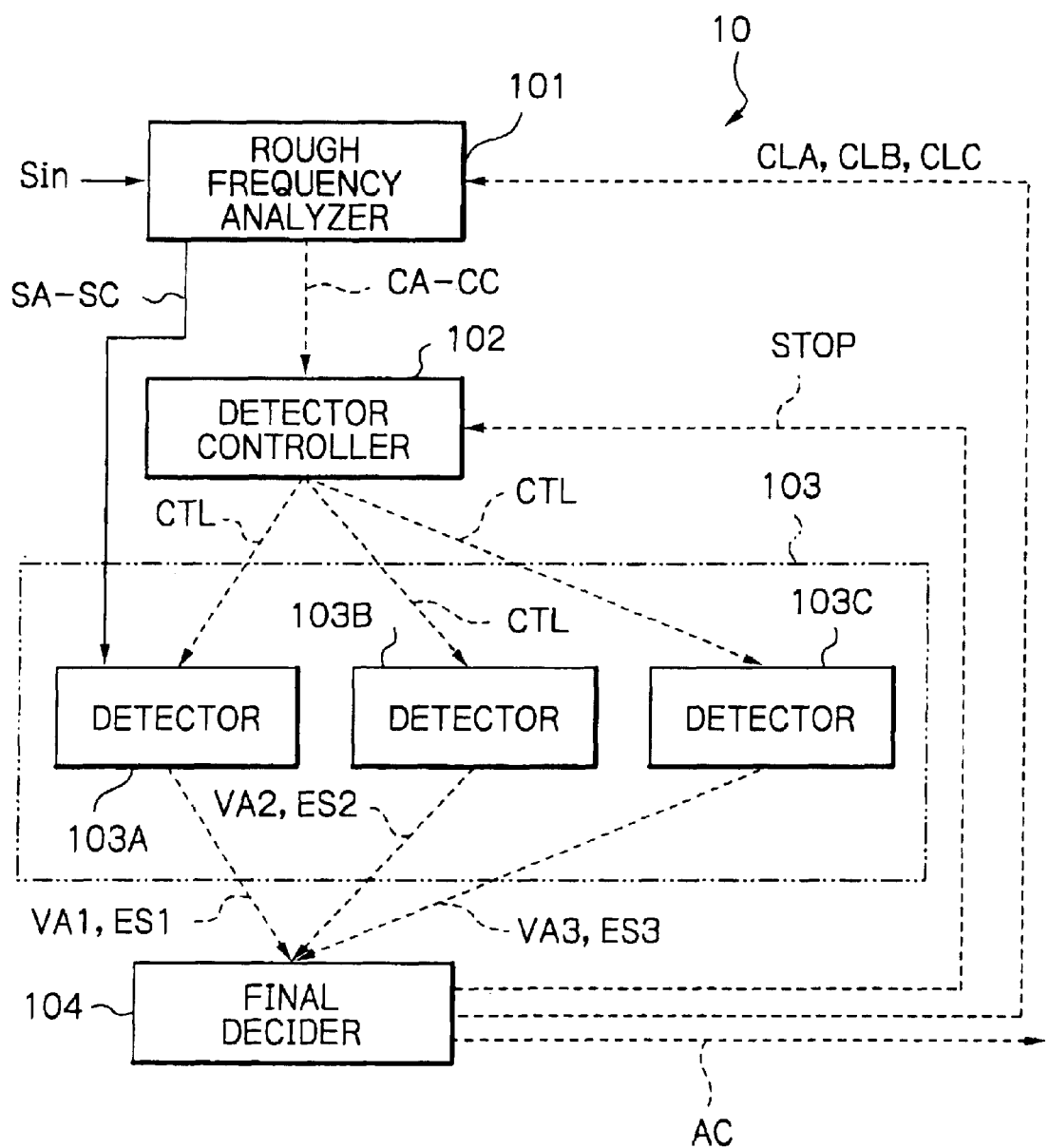
FIG. 1 is a schematic block diagram showing an embodiment of tonal signal detector circuitry in accordance with the present invention.

Referring to FIG. 1 of the accompanying drawings, circuitry for detecting tonal signals in accordance with the present invention is generally designated by the reference numeral 10. Briefly, the tonal signal detector circuitry 10 achieves both the reduction of calculation requirements and the enhancement of a tone detecting ability by distributing the processor capacity of computing circuitry with weight to the frequency and time domains.

The tonal signal detector circuitry 10 is installed in an environment, such as an analog telephone network, in which tonal signals are transmitted. In the illustrative embodiment, the circuitry 10 is built in a multifunction telephone set, not shown, capable of indicating the user of the telephone set the kind of a tone received.

As shown in FIG. 1, the tonal signal detector circuitry 10 generally comprises a rough frequency analyzer 101, a detector controller or fine frequency analyzer controller 102, detectors or fine frequency analyzers 103A, 103B and 103C, and a final decider 104, which are interconnected to each other as illustrated. In the figure, the solid lines represent the connections of signals to be detected, while the rough and fine dotted lines represent the connections of detected and control signals, respectively. The rough, or general, frequency analyzer 101 is adapted to receive a tonal signal Sin via, e.g., an analog telephone circuit in which the detector circuitry is incorporated, and roughly analyze the entire, or broader, frequency band of the input signal Sin with lower accuracy. In the context, the accuracy in frequency analysis is directed to either the frequency domain or the time domain.

Figure 2:
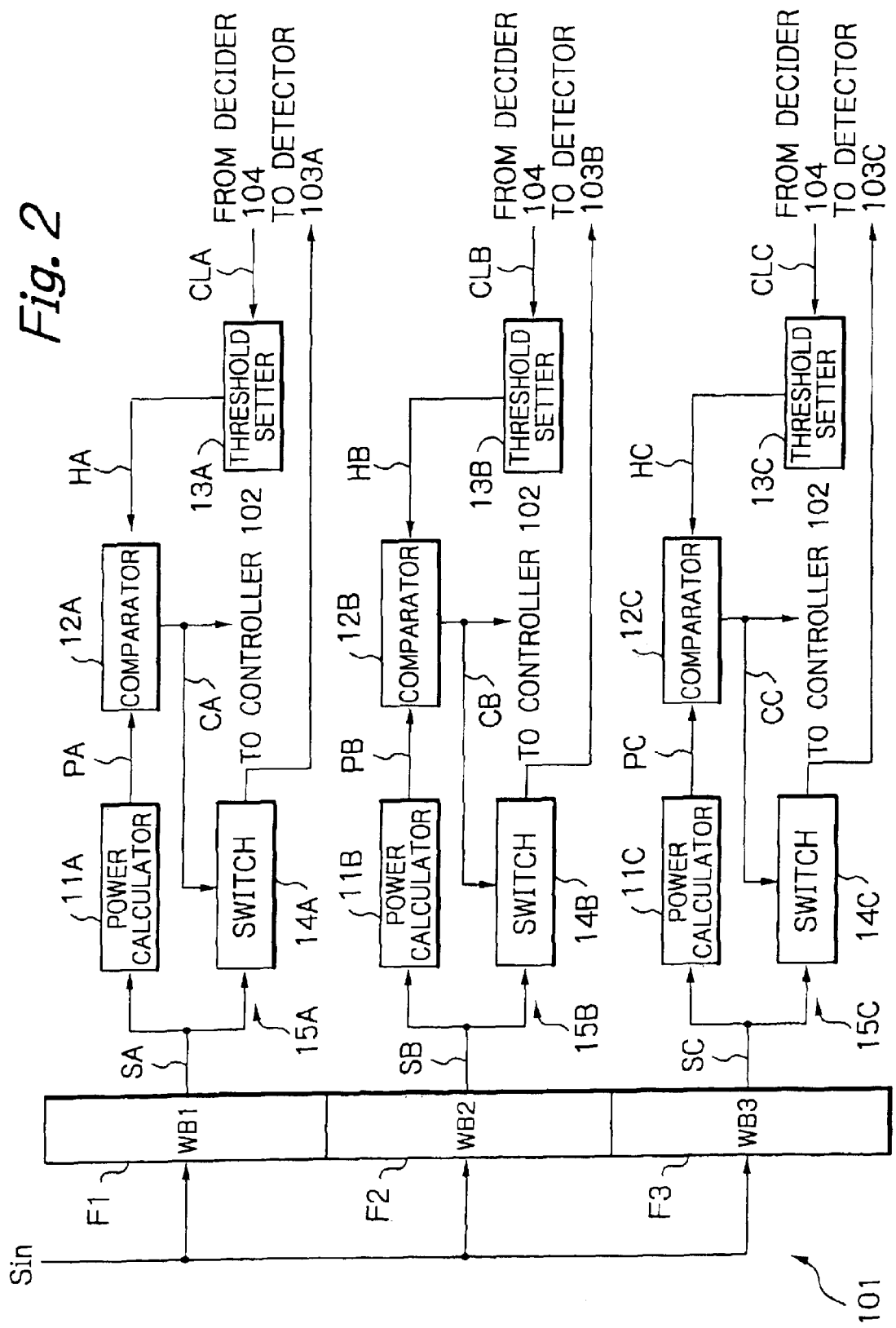
FIG. 2 is a schematic block diagram showing a specific configuration of a rough frequency analyzer included in the embodiment shown in FIG. 1.

FIG. 2 shows a specific configuration of the rough frequency analyzer 101. The rough frequency analyzer 101 includes three filters F1, F2 and F3 identical in configuration to each other except for the passband thereof, and rough frequency processing circuits 15A, 15B and 15C also identical in configuration to each other and connected to the filters F1, F2 and F3, respectively, as shown in the figure.

Figures 5, 6:
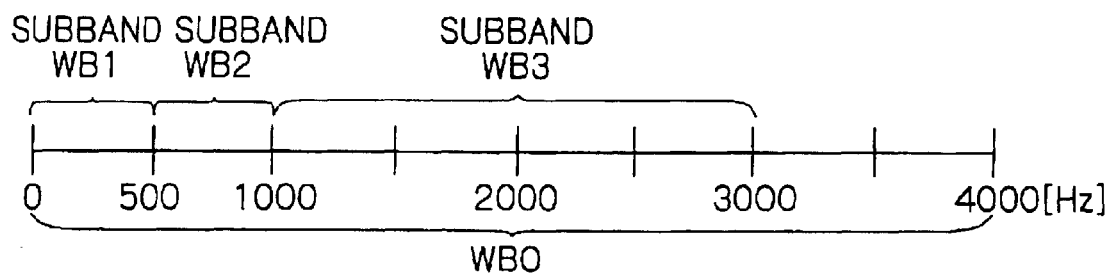
FIG. 5 schematically shows a specific frequency band divided into a plurality of frequency subbands with which the illustrative embodiment is operable.
FIG. 6 shows in a list a specific correspondence between the frequency subbands of FIG. 5 and the detectors to be enabled.

With reference to FIG. 5 specifically, in the embodiment, the entire frequency band WB0 of the input signal Sin extends from 0 Hz to 4,000 Hz. In the embodiment also, the entire frequency band WB0 includes a subband WB1 ranging from 0 Hz to 500 Hz, another subband WB2 ranging from 500 Hz to 1,000 Hz, and a further subband WB3 ranging from 1,000 Hz to 3,000 Hz. Tonal signals T1; T2 and T3 to be detected may be included in one or more of the subbands WB1, WB2 and WB3, as illustrated in FIG. 6. In the embodiment, the subbands, or narrower bands, WB1, WB2 and WB3 respectively include a signaling tone T1, the lower frequency components of a DTMF (Dial Tone Multiple Frequency) signal (push button or PB signal) T2, and the higher frequency components of the DTMF signal T2 or a FAX (facsimile) tonal signal T3. Under a usual condition, two or more of the tonal signals T1, T2 and T3 are not included nor received, but only one of them is included or received at a time.

Referring again to FIG. 2, the filter F1 is adapted to pick out only a component of the input signal Sin lying in the frequency subband WB1 from the entire frequency band WB0 and pass the component therethrough as an output signal SA. Likewise, the filter F2 is adapted to pick out only a component of the signal Sin lying in the frequency subband WB2 from the entire frequency band WB0 and pass the component therethrough as an output signal SB. Further, the filter F3 is adapted to pick out only a component of the signal Sin lying in the frequency subband WB3 from the entire frequency band WB0 and pass the component therethrough as an output signal SC. Stated another way, the filters F1, F2 and F3 are respectively adapted to detect the signaling tone T1, the DTMF signal T2 and the FAX tone signal T3.

The rough frequency processing circuit 15A connected to the filter F1 is made up of a power calculator 11A, a comparator 12A, a threshold setter 13A, and a switch 14A interconnected to each other as illustrated. The power calculator 11A is adapted to calculate the power of the signal SA fed from the filter F1 and output a power value PA representative of the calculated power. The power value PA is input to the comparator 12A. The comparator 12A is adapted to compare the power value PA with a threshold value HA received from the threshold setter 13A and output the result of comparison CA to the detector controller 102, FIG. 1. The result of comparison CA becomes active if the power value PA is equal to or higher than the threshold value HA or becomes inactive if otherwise. Usually, the threshold setters 13A, 13B and 13C set the threshold values HA, HB and HC which are different from each other between the rough frequency processing circuits 15A, 15B and 15C.

The switch 14A is adapted to receive the signal SA output from the filter F1 and has its control input terminal to be responsive to the result of comparison CA from the comparator 12A. The switch 14A is adapted to turn on and transfer the signal SA to the detector 103A, FIG. 1, if the result of comparison CA is active, and turn off if otherwise. The switch 14A may be implemented as a narrow-band filter, if desired, so as to play the role of a filter when turned on.

The result of comparison CA output from the comparator 12A is delivered also to the detector controller 102 as an indication signal indicative of whether or not a tone is present in the assigned subband WB1. The indication signal shows that a tone is detected in the assigned subband when active or no tone is detected in that subband when inactive. Similarly, the comparators 12B and 12C included in the other rough frequency processing circuits 15B and 15C, respectively, are also adapted to output indication signals CB and CC, respectively.

When the detector controller 102 receives any one of the indications signals CA, CB and CC which is rendered active, the detector controller 102 enables one of the detectors 103A, 103B and 103C which is associated with the active signal and disables the remaining detectors in accordance with the combination of the statuses of the indication signals CA, CB and CC. This means that one of the detectors 103A, 103B and 103C which is associated with a subband in which a tonal signal may exist is enabled whereas the remaining detectors which are associated with subbands in which no tonal signals are expected to exist are disabled. The detector controller 102 may enable the plurality of detectors at the same time when failing to determine a single candidate frequency subband in which a tonal signal may exist due to noise or similar disturbance involved in the input signal Sin.

The rough frequency processing circuits 15B and 15C are connected to receive signals SB and SC from the filters F2 and F3, respectively. The processing circuits 15B and 15C are identical in configuration with the rough frequency processing circuit 15A except that the power calculators 11B and 11C are adapted to output power values PB and PC, respectively, the comparators 12B and 12C are adapted to output the results of comparison CB and CC, respectively, and the threshold setters 13B and 13C are adapted to output threshold values HB and HC, respectively. In FIG. 2, the identical components of the circuits 15A, 15B and 15C are designated by the same reference numerals with suffixes A, B and C corresponding.

Usually, in the configuration shown in FIG. 2, the threshold values HA, HB and HC output from the threshold setters 13A, 13B and 13C, respectively, are different from each other. In addition, the threshold values HA, HB and HC may be fixed at the constant values thereof. With the illustrative embodiment, the threshold setters 13A, 13B and 13C are adapted to vary the threshold values HA, HB and HC in response to the threshold control signals CLA, CLB and CLC, respectively, received from the final decider 104. That will be described later.

A specific configuration of the detector or fine frequency analyzer 103A will be described with reference to FIG. 3. The configuration to be described applies to the remaining detectors 103B and 103C as well. The detectors 103A, 13B and 103C each are enabled and disabled under the control of the detector controller 102 for detecting preselected one of the tonal signals T1, T2 and T3 on the basis of a frequency peak or a group of frequency peaks.

Figure 3:
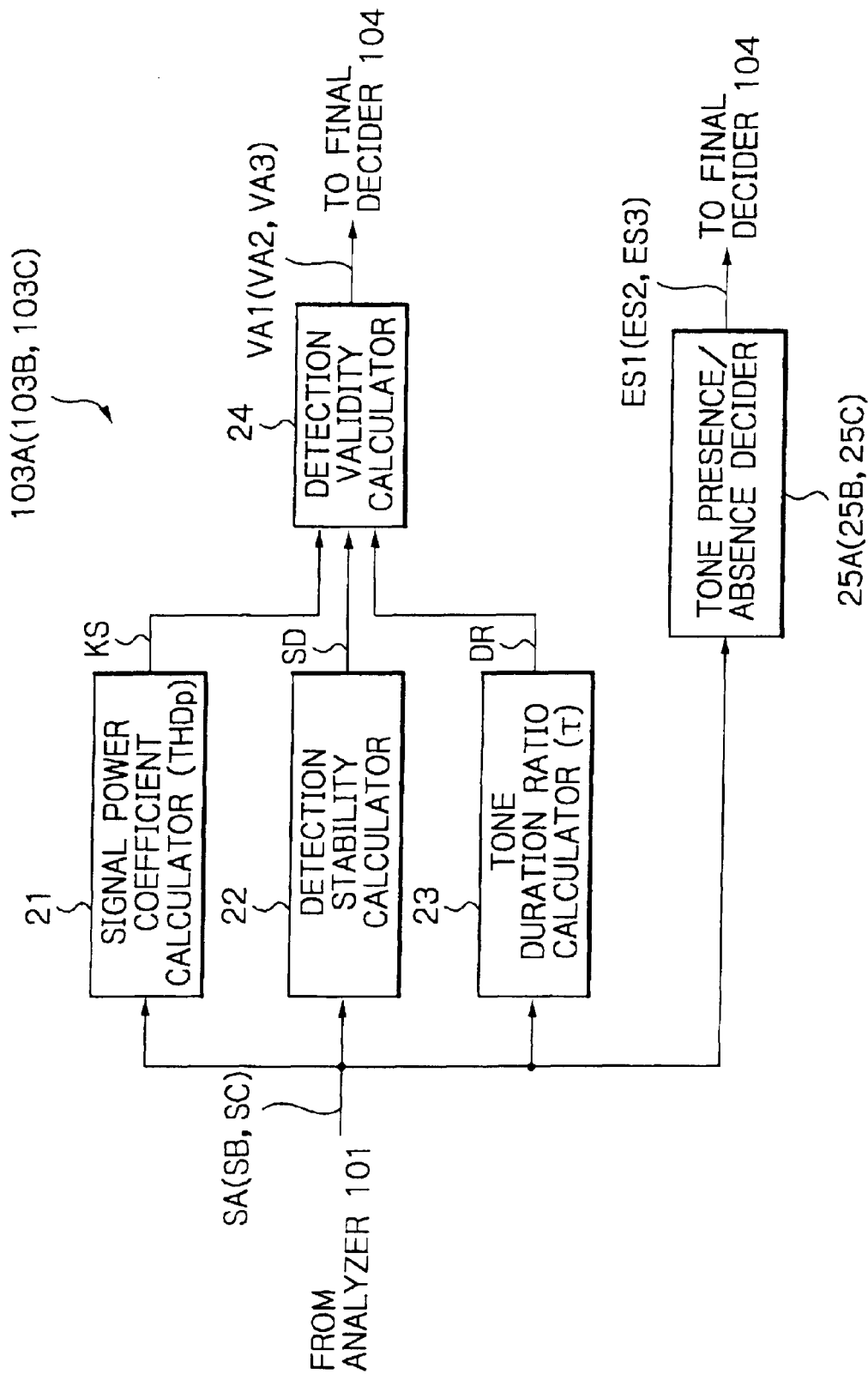
FIG. 3 is a schematic block diagram showing a specific configuration of a detector also included in the illustrative embodiment.

As shown in FIG. 3, the detector 103A includes a signal power coefficient calculator 21, a detection stability calculator 22, a tone duration ratio calculator 23, a detection validity calculator 24, and a tone presence/absence decider 25A, which are interconnected to each other as illustrated. The signal power coefficient calculator 21 is adapted for calculating a signal power coefficient KS represented by Dp(t), which is defined below:

$$Dp(t)=1 \text{ if } p(t) \geq THDp,$$
$$Dp(t)=0 \text{ if } p(t) < THDp, \quad (1)$$

where p (t) denotes the signal power of a target tone, i.e., the signaling tone T1 at a discrete time t in the case of the detector 103, and THDp a preselected threshold value. The expression means that Dp (t) takes either (logical) ZERO or (logical) ONE determined by the signal power of a target tone with respect to a preselected threshold value THDp.

The detection stability calculator 22 is adapted for calculating the degree of detection stability SD at the time t. The degree of detection stability SD is representative of the degree of variation of the target tone T1 included in the filtered signal SA with respect to time and is expressed as:

$$Ds(t)=1-|p(t)-p(t-1)|/p(t-1) \quad (2)$$

In the expression (2), if Ds (t) is smaller than zero, then Ds (t) is zero. The degree of stability Ds (t) has a value between 0 and 1 and shows a higher degree of stability as it increases toward the unity. More specifically, a degree of stability Ds (t) closer to the unity shows when the variation of signal power is smaller between discrete times t and t−1.

The tone duration ratio calculator 23 is adapted to produce a tone duration ratio DR representative of the ratio of the duration of the target tone T1 to a decision period of time, which is required for determining whether or not the target tone T1 has been detected. The tone duration ratio DR is produced by DT (t)

$$DT(t) = \sum_{n=t_{start}}^{t} Dp(n)/\tau \quad \text{if } t - t_{start} < \tau,$$

$$DT(t) = \sum_{n=t-\tau}^{t} Dp(n)/\tau \quad \text{if } t - t_{start} \geq \tau, \quad (3)$$

where τ denotes the decision time, and $t_{start}$ denotes a time at which the detector 103A is enabled. The tone duration ratio DT (t) also takes a value between 0 and 1 and indicates a greater ratio as it approaches the unity.

The detection validity calculator 24 is connected to receive, as shown in FIG. 3, the signal KS output from the signal power coefficient calculator 21, the signal SD output from the detection stability calculator 22, and the signal DR output from the tone duration ratio calculator 23. The calculator 24 is adapted for using the input signals KS, SD and DR, i.e., Dp (T), Ds (t) and DT (t) to calculate a degree of detection validity VA1. The degree of detection validity VA1 is represented by DE (t):

$$DE(t)=Dp(t) \times Ds(t) \times DT(t) \quad (4)$$

The degree of detection validity DE (t) also takes a value between 0 and 1 and indicates a higher degree of detection validity as it approaches the unity.

The tone presence/absence decider 25A is adapted for determining whether or not the signaling tone T1 is present, and outputs the result of decision in the form of signal ES1.

In the specific configuration of the detector 103A shown in FIG. 3, the signal SA is output from the filter F1, FIG. 2, via the switch 14A included in the rough frequency processing circuit 15A to be delivered to the three calculators 21, 22 and 23 as well as the decider 25A. Alternatively, the detector circuitry 10 may be adapted to receive the input signal Sin from the analog telephone line directly by the detector 103A, FIG. 1, which may be adapted to deal with the input signal Sin by the calculators 21, 22 and 23, and the decider 25A.

For determining whether or not the signaling tone T1 is present, the tone presence/absence decider 25A may incorporate an algorithm and/or processor means designed optimally for the nature of the frequency or time domain of the signaling tone T1. The tone presence/absence decider 25A and the remaining tone presence/absence deciders 25B and 25C are specifically provided for the nature of the target tones T1, T2 and T3 to be determined, respectively.

More specifically, as for the tone presence/absence decider 25A, the signaling tone T1 to be detected has a single frequency, i.e., a single frequency peak. In terms of that nature, the decider 25A may preferably be adapted to include a band-pass filter that is designed to simply pass the single frequency, so that signal power is calculated on the basis of a signal passed through that filter.

The tone presence/absence decider 25B included in the detector 103B executes decision matching with the DTMF signal to be detected. Usually, a specific PB signal is constituted of a combination of one selected from a group of four higher frequencies and one selected from a group of four lower frequencies. Both groups of frequencies are stored in a ROM (Read Only Memory not shown) adapted for generating PB signals. Two frequencies thus selected are combined to generate a DTMF signal. It follows that there exist sixteen different combinations of the frequencies (4×4= 16) so that a plurality of frequencies are transmitted and received. The decider 25B may therefore preferably incorporate a linear predictive filter from the efficiency standpoint.

The tone presence/absence decider 25C, like the tone presence/absence decider 25A, should preferably use a band-pass filter that is also adapted to simply pass a single frequency. This is because the FAX tone signal T3 has a single frequency and therefore a single frequency peak, like the signaling tone T1. In this case, signal power is also calculated on the basis of a signal having passed through the band-pass filter.

The tone presence/absence deciders 25A, 25B and 25C may be adapted to perform, e.g., FFT (Fast Fourier Transform) in order to make decision on the basis of the contour of a frequency spectrum, as needed. Even this alternative scheme is practicable with a smaller amount of calculations than the conventional schemes because the frequency band to be subjected to FFT is far narrower than the frequency band WB0, FIG. 5.

The detector 103A is adapted to output the degree of detection validity VA1 and the result of decision ES1. Likewise, the detector 103B is adapted to output a degree of detection validity VA2 and a result of decision ES2 while the detector 103C is to output a degree of detection validity VA3 and a result of decision ES3. The degrees of validity VA1, VA2 and VA3 and the results of decision ES1, ES2 and ES3 are input to the final decider 104, FIG. 1. The final decider 104 is adapted to exclude part of the information received from the detectors 103A, 103B and 103C but contradictory to each other, to output a tone indication signal AC representative of the most probable result of a tonal signal detected.

Figure 4:
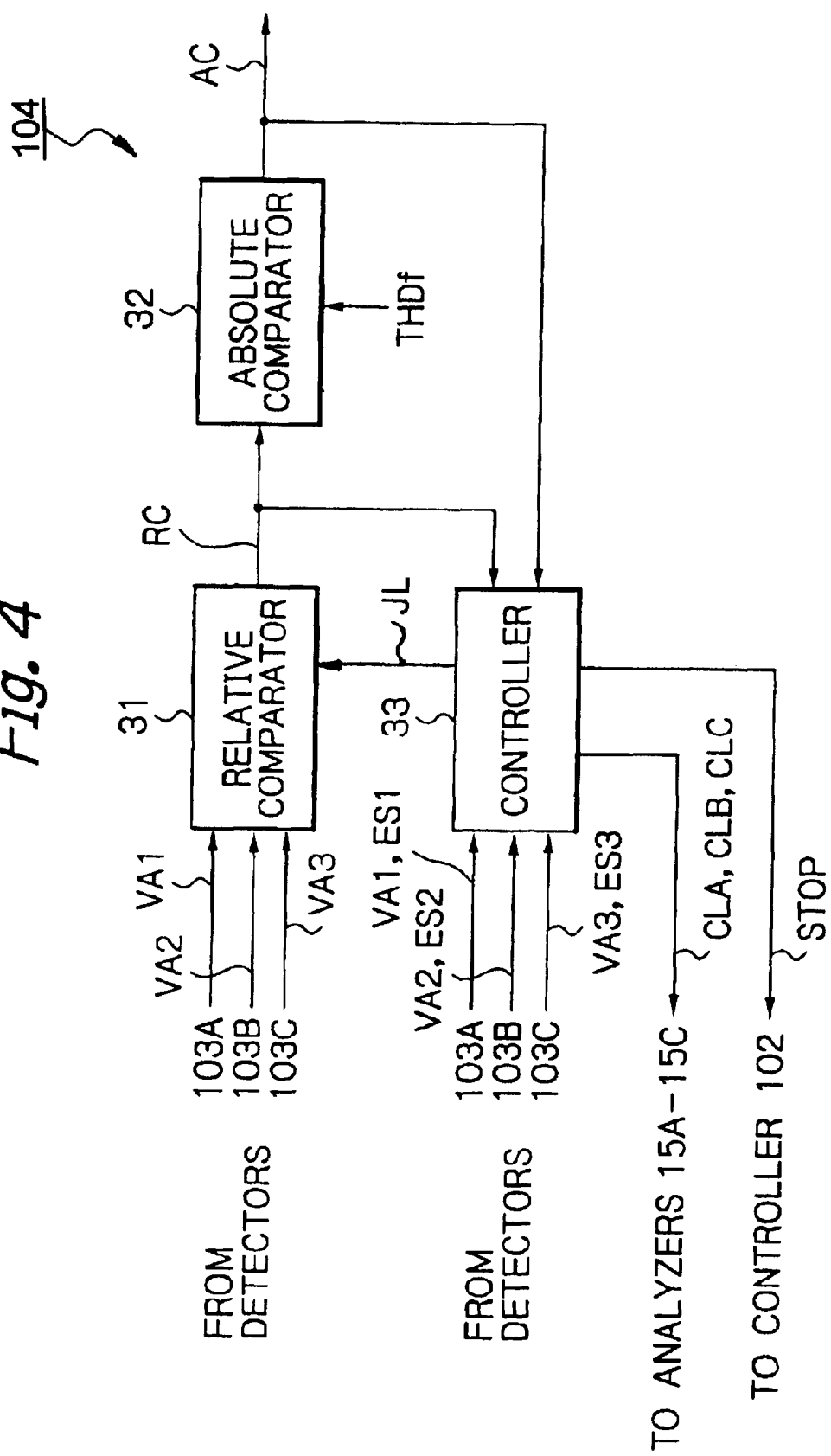
FIG. 4 is a schematic block diagram showing a specific configuration of a final decider further included in the illustrative embodiment.

FIG. 4 shows a specific configuration of the final decider 104. As shown, the final decider 104 is generally made up of a relative comparator 31, an absolute comparator 32, and a controller 33, which are interconnected to each other. The controller 33 is adapted to receive the degrees of detection validity VA1, VA2 and VA3 and the results of decision ES1, ES2 and ES3 output from the detectors 103A, 103B and 103C, respectively. If two or more of the results of decision ES1, ES2 and ES3 are indicative of the presence of a tone, then the controller 33 feeds a comparison control signal JL to the relative comparator 31 to enable the comparator 31.

The relative comparator 31 is adapted for receiving the degrees of detection validity VA1, VA2 and VA3 output from the detectors 103A, 103B and 103C, respectively. When enabled by the comparison control signal JL, the relative comparator 31 compares the degrees of detection validity VA1, VA2 and VA3 to each other and selects one of them which has the highest value to deliver a signal RC representative of the selected one, i.e. the highest degree of detection validity, to the absolute comparator 32 and controller 33.

If two or more of the results of decision ES1, ES2 and ES3 are indicative of the presence of a tone, then the controller 33 sends out a detector disable command STOP to the detector controller 102, FIG. 1, in response to the signal RC, which is received from the relative comparator 31. The command STOP causes the detector controller 102 to disable corresponding one or more of the detectors which has or have developed the degree or degrees of detection validity that was or were not highest, i.e., not selected by the relative comparator 31. That basically relies upon the fact that the input signal Sin normally does not include two or more, but only one, of the different tonal signals T1, T2 and T3 together. It is therefore more probable that the not highest degrees of detection validity are erroneous, as will later be described more specifically.

Further, the controller 33 is adapted such that if a degree of detection validity DE (THDt) output in a preselected period of time THDt since enabled is lower than a preselected threshold degree THDs then the controller 33 also delivers the detector disable command STOP to the detector controller 102 for thereby disabling the detector that has output the above-mentioned degree of validity DE. Particular periods of time THDt are assigned to the respective detectors 103A, 103B and 103C beforehand.

A final threshold value THDf is assigned to the absolute comparator 32, which is constantly enabled. If the signal RC received from the relative comparator 31 is equal to or lower than the final threshold value THDf, then the absolute comparator 32 determines that a target tonal signal designated by the signal RC is actually present, and outputs the tone indication signal AC. If the signal RC is lower than the final threshold value THDf, then the absolute comparator 32 does not output the tone indication signal AC, determining that the tonal signal in question is actually absent. In the illustrative embodiment, the final threshold value THDf is fixed although it may be variable.

Assume that the result of decision, e.g., ES1 output from the detector 103A, is indicative of the presence of the signaling tone T1, but the absolute comparator 32 does not output the tone indication signal, that being an erroneous decision. This may occur when noise level, i.e., noise power in the frequency subband WB1 assigned to the detector 103A is high. In case of such an erroneous decision, the controller 33 may be adapted to produce the threshold control signal CLA mentioned earlier to increase the threshold value HA assigned to the rough frequency processing circuit 15A. This successfully prevents the erroneous decision from continuously occurring in the detector 103A. Conversely, so long as a condition continues which is free from the erroneous decision, the controller 33 may adaptively produce the threshold control signal CLA to reduce the threshold value HA.

Additionally, the controller 33 in the final decider 104 is also adapted to output threshold control signals CLB and CLC meant for the rough frequency processing circuits 15B and 15C, respectively.

When the absolute comparator 32, i.e., the final decider 104, outputs the tone indication signal AC, the multifunction telephone set, not shown, loaded with the tonal signal detection circuitry 10 displays information that shows the user the kind of a target tone designated by the signal AC. For example, use may be made of LEDs (Light Emitting Diodes, not shown) that are adapted to distinguishably indicate the signaling tone T1, DTMF signal T2, and FAX signal from each other.

A specific operation of the illustrative embodiment will be described hereinafter. Assume that the tonal signal Sin is input to the rough frequency analyzer 101 and is the signaling tone T1 by way of example. Then, while the signal SA output from the filter F1, FIG. 2, contains the signaling tone T1, the signals SB and SC output from the filters F2 and F3 contain only noise. Noise refers to tonal signals other than the target tonal signals T1, T2 and T3.

Noise power is, in many cases, sufficiently smaller than signal power that the tonal signals T1, T2 and T3 indicate each. Therefore, in FIG. 2, the power value PA output from the power calculator 11A renders the result of comparison CA output from the comparator 12A active. The power values PB and PC output from the other power calculators 11B and 1C, respectively, render the results of comparison CB and CC inactive. Consequently, only the result of comparison CA turns on the switch 14A and causes it to transfer the signal SA to the detector 103A. The other switches 14B and 14C do not transfer the signals SB and SC to the detectors 103B and 103C, respectively.

The detector controller 102 receives the results of comparison CA, CB and CC from the comparators 12A, 12B and 12C, respectively. The detector controller 102 enables only the detector 103A output the active result of comparison CA while disabling the other detectors 103B and 103C. In the detector 103A having received the signal SA from the rough frequency analyzer 101 and enabled by the detector controller 102, the aforementioned expressions (1) (2) and (3) are solved by the signal power coefficient calculator 21, degree of detection stability calculator 22 and tone duration ratio calculator 23, respectively, which in turn output the results of calculations KS, SD and DR, respectively.

The degree of detection validity calculator 24 having received the results of calculations KS, SD and DR substitutes them for the expression (4) for thereby outputting a degree of detection validity VA1. At the same time, the tone presence/absence decider 25 makes the previously stated decision with the signal SA and thereby determines whether or not the signaling tone or target signal T1 exists in the signal SA. The decider 25 then outputs the result of decision ES1.

In the final decider 104, FIG. 4, the relative comparator 31 receives the degree of detection validity VA1 while the controller receives the result of estimation ES1 as well as the above information VA1. At this instant, the comparison control signal JL output from the controller 33 does not enable the relative comparator 31 because the other detectors 103B and 103C disabled by the detector controller 102 do not output a degree of detection validity. The relative comparator 31 therefore simply transfers the degree of detection validity VA1 to the absolute comparator 32 in the form of the signal RC.

The absolute comparator 32 compares the degree of detection validity VA1 provided in the form of signal RC with the final threshold value THDf and executes processing in accordance with the result of comparison. Specifically, if the degree of detection validity VA1 is equal to or higher than the final threshold value THDf, then the absolute comparator 32 determines that the signaling tone T1 exists, and outputs the tone indication signal AC indicative of the presence of the signal T1. If the degree of detection validity VA1 is lower than the threshold value THDf, then the absolute comparator 32 does not output the tone indication signal AC, determining that the signaling tone T1 is absent.

In response to the signal AC output from the absolute comparator 32 and indicative of the signaling tone T1, the multifunction telephone set turns on one of the LEDs, not shown, assigned to the tonal signal T1, informing the user of the receipt of the signal T1.

In this case, if the noise power in the frequency subband WB2 or WB3 is remarkable, then it would be likely that the switch 14B or 14C turns on due to erroneous decision, causing the detector 103B or 103C to be enabled. However, the components 21, 22 and 23 of the detector 103B or 103C or the tone presence/absence decider 25B or 25C appropriately process the situation to distinguish the noise from the target tone T2 or T3, respectively. Consequently, the degree of detection validity VA2 or VA3 decreases or the result of decision ES2 or ES3 shows that the target tonal signal T2 or T3, respectively, is absent. The final decider 104 can therefore accurately make the final decision free from the above-mentioned erroneous decision and can output a highly reliable tone indication signal AC.

In the operation described above, each of the detectors 103A, 103B and 103C should monitor merely a particular frequency subband including a respective target tone frequency. This realizes accurate tone detection with a minimum of calculation requirements, compared to the case wherein the entire frequency band WB0 is monitored with even accuracy. Further, unnecessary ones of the detectors 103A, 103B and 103C (103B and 103C in the specific situation described above) are adaptively disabled to further reduce calculation requirements and to scale down hardware or the computing circuitry.

The final decider 104 makes total decision with the information VA1, VA2 and VA3 and information ES1, ES2 and ES3 output from the detectors 103A, 103B and 103C, respectively. It follows that the results of detection contradictory to each other are prevented from being imparted to the user. In addition, because the final decider 104 does not output any erroneous tone indication signal AC, utmost calculation accuracy is not required of the detectors 103A, 103B and 103C.

Moreover, the detectors 103A, 103B and 103C can each use an algorithm or processing means optimal for the nature of a particular target tone to execute respective decision. This is far more efficient than detecting all of the tonal signals T1, T2 and T3 by using a single algorithm or a single processing means.

While the illustrative embodiment has concentrated on the signaling tone T1, DTMF signal T2 and FAX signal 3, the present invention is applicable to any other tonal signals including MF (Multi-Frequency code) signals. Of course, the number of tonal signals to be detected is not limited to three, but may be less than or more than three, as desired.

The illustrative embodiment has been shown and describing to detect tonal signals by paying attention to the structure or nature of each tonal signal in the frequency domain. Alternatively, attention may be paid to the structure or nature of each tonal signal in the time domain because each tonal signal has a particular structure or nature in the time domain as well.

While the illustrative embodiment is mainly implemented by hardware, the present invention may alternatively be implemented by software. In that case, the detectors 103A, 103B and 103C, for example, will be accomplished on the same hardware or computing circuitry, and only one of the detectors which is enabled by the detector controller 102 will be generated on the software.

The final decider 104 is omissible under the environment in which, e.g., the input signal Sin has high quality and contains a minimum of noise. More specifically, in such a condition, the detectors 103A, 103B and 103C will not output information (VA1, VA2 and VA3, and ES1, ES2 and ES3) that are contradictory to each other.

In summary, tone detecting circuitry of the present invention uses degrees of detection validity each derived from a particular degree of detection stability and a particular tone duration ratio; the degree of detection stability and tone duration ratio reflect the results of past detection. This, coupled with the effective use of detectors, insures accurate tone detection and therefore a highly accurate tone indication signal with a minimum of calculation requirements. The performance of the circuitry can therefore be enhanced with a smaller-scale computing circuit having a limited processor capacity and therefore lower cost.

The entire disclosure of Japanese patent application No. 2001-48903 filed on Feb. 23, 2001, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. Circuitry for detecting a plurality of tonal signals each having a particular nature in either one of a frequency domain and a time domain while distinguishing the plurality of tonal signals from each other, comprising:

a rough frequency analyzing circuit for roughly analyzing an input signal in a frequency band with first accuracy in the frequency or time domain to thereby roughly distinguish the plurality of tonal signals to produce a first result, the frequency band consisting of a plurality of subbands;

a plurality of fine frequency analyzing circuits each assigned to particular one of the plurality of subbands which is associated with a particular target tonal signal of the plurality of tonal signals for detecting, in the particular subband, an attribute of a power variation of the target tonal signal with respect to time with second accuracy in a direction of the frequency or time domain to thereby finely identify the target tonal signal to produce a second result, the second accuracy being higher than the first accuracy;

a control circuit for selectively enabling and disabling said plurality of fine frequency analyzing circuits in accordance with the second result, whereby one of said plurality of fine frequency analyzing circuits is enabled and is selected under the control of said control circuit; and a selecting circuit for selecting one of the second results to finally decide adequately one of the second results when the second results are contradictory to each other.

wherein each of said plurality of fine frequency analyzing circuits comprises:

a detection validity calculating circuit for obtaining a degree of detection validity from the first result; and a tone deciding circuit for deciding from the first result whether or not the target tonal signal is present to produce a third result;

said selecting circuit comprising a first comparator circuit interconnected to said plurality of fine frequency analyzing circuits for determining, from the degrees of detection validity and the third result, the highest one of the degrees of detection validity.

2. The circuitry in accordance with claim 1, wherein said selecting circuit further comprises a second comparator connected to said first comparator for comparing the highest degree of detection validity with a threshold value to produce a tone detection signal when the highest degree of detection validity is not less than the threshold value.

3. The circuitry in accordance with claim 1, wherein said detection validity calculating circuit comprises:
   a signal power coefficient calculator for calculating a power coefficient from the first result;
   a detection stability calculator for calculating a detection stability from the first result; and
   a tone duration ratio calculator for calculating a duration of the target tonal signal to a decision period of time required for determining whether or not the target tone signal has been detected;
   said detection validity calculating circuit calculating the degree of detection validity from the power coefficient, the detection stability and the duration of the target tonal signal.

4. Circuitry for detecting a plurality of tonal signals each having a particular nature in either one of a frequency domain and a time domain while distinguishing the plurality of tonal signals from each other, comprising:
   a rough frequency analyzing circuit for roughly analyzing an input signal in a frequency band with first accuracy in the frequency or time domain to thereby roughly distinguish the plurality of tonal signals to produce a first result, the frequency band consisting of a plurality of subbands;
   a plurality of fine frequency analyzing circuits each assigned to particular one of the plurality of subbands which is associated with a particular target tonal signal of the plurality of tonal signals for detecting, in the particular subband, an attribute of a power variation of the target tonal signal with respect to time with second accuracy in a direction of the frequency or time domain to thereby finely identify the target tonal signal to produce a second result, the second accuracy being higher than the first accuracy; and
   a control circuit for selectively enabling and disabling said plurality of fine frequency analyzing circuits in accordance with the second result, whereby one of said plurality of fine frequency analyzing circuits is enabled and is selected under the control of said control circuit; and
   wherein said rough frequency analyzing circuit comprises:
     a plurality of filters corresponding to the plurality of subbands for separating the frequency band of the input signal into corresponding components of the plurality of subbands;
     a plurality of power calculators corresponding to said plurality of filters each for calculating power of corresponding one of the components; and
     a plurality of comparators corresponding to said plurality of power calculators each for comparing the power calculated by associated one of said plurality of power calculators with a threshold value to thereby output a result of comparison,
     said rough frequency analyzing circuit roughly distinguishing the tonal signals in accordance with the results of comparison to produce the first result;

wherein the circuitry further comprises a threshold control circuit for controlling the threshold value in accordance with the attribute detected by said plurality of fine frequency analyzing circuits.

5. A method of detecting a plurality of tonal signals each having a particular nature in either one of frequency and time domains while distinguishing the plurality of tonal signals from each other, comprising the steps of:
   roughly analyzing an input signal in a frequency band with a first accuracy in the frequency or time domain to thereby roughly distinguish the plurality of tonal signals from each other to produce a first result, the frequency band consisting of a plurality of subbands;
   detecting, in each of the plurality of subbands, an attribute of a power variation of a particular target tonal signal of the plurality of tonal signals which is associated with each subband with respect to time with a second accuracy in a direction of the frequency or time domain to thereby finely identify the target tonal signal to produce a second result, the second accuracy being higher than the first accuracy;
   selecting the plurality of subbands to be subjected to said step of detecting the attribute in accordance with the second results; and
   selecting one of the second results to finally decide adequately one of the second results when the second results are contradictory to each other,
   wherein said step of detecting the attribute comprises the substeps of:
     obtaining a degree of detection validity from the first result; and
     deciding from the first result whether or not the target tonal signal is present;
   said step of selecting one of the second results comprising the substep of determining the highest one of the degrees of detection validity from the degrees of detection validity and the second results.

6. The method in accordance with claim 5, wherein said step of selecting one of the second results comprising the substep of comparing the highest degree of detection validity with a threshold value to produce a tone detection signal when the highest degree of detection validity is not less than the threshold value.

7. The method in accordance with claim 5, wherein said step of obtaining the degrees of detection validity comprises the substeps of:
   calculating a power coefficient from the first result;
   calculating a detection stability from the first result; and
   calculating a duration of the target tonal signal to a decision period of time required from the first result for determining whether or not the target tone signal has been detected;
   said step of calculating the degrees of detection validity comprising the substep of calculating the degree of detection validity from the power coefficient, the detection stability and the duration of the target tonal signal.

8. A method of detecting a plurality of tonal signals each having a particular nature in either one of frequency and time domains while distinguishing the plurality of tonal signals from each other, comprising the steps of:
   roughly analyzing an input signal in a frequency band with a first accuracy in the frequency or time domain to thereby roughly distinguish the plurality of tonal signals from each other to produce a first result, the frequency band consisting of a plurality of subbands;

detecting, in each of the plurality of subbands, an attribute of a power variation of a particular target tonal signal of the plurality of tonal signals which is associated with each subband with respect to time with a second accuracy in a direction of the frequency or time domain to thereby finely identify the target tonal signal to produce a second result, the second accuracy being higher than the first accuracy;

selecting the plurality of subbands to be subjected to said step of detecting the attribute in accordance with the second results; and wherein said step of roughly analyzing the input signal comprises the substeps of:

separating, in each of the plurality of subbands, the frequency band of the input signal into corresponding components of the plurality of subbands;

calculating power of each of the components;

comparing each of the powers calculated with a threshold value to thereby output a result of comparison to produce a third result; and roughly distinguishing the tonal signals in accordance with the third results;

wherein the method further comprises the step of controlling the threshold value in accordance with the attributes detected.

* * * * *